3,355,480

ROOM TEMPERATURE VULCANIZING SILICONE RUBBER COMPOSITIONS

Joel F. Di Paola, Cohoes, N.Y., assignor to General Electric Company, a corporation of New York No Drawing. Filed Oct. 20, 1966, Ser. No. 587,974
7 Claims. (Cl. 260—465)

ABSTRACT OF THE DISCLOSURE

A room temperature vulcanizing silicone composition comprising a silanol chain-stopped diorganopolysiloxane fluid and an acyloxyaminosilane.

This application is directed to room temperature vulcanizing silicone elastomer compositions. In particular, this application is directed to compositions which are stable under anhydrous conditions, but which cure to the solid, elastic state upon exposure to moisture.

Heretofore it has been known that room temperature curing silicone rubber compositions could be prepared by mixing an organotriacyloxysilane or an organotriaminosilane with a silanol chain-stopped diorganopolysiloxane fluid. Typical of the organotriacyloxysilanes have been materials such as methyltriacetoxysilane. Typical of the organotriaminosilanes have been methyl tris-(isopropylamino)silane. While useful room temperature vulcanizing silicone elastomer compositions have resulted from these prior art treatments, several disadvantages have been observed. For example, the rate at which the organotriacyloxysilanes and organo trisaminosilanes have cured the silanol chain-stopped diorganopolysiloxanes has sometimes not been as fast as desired and in other cases the rate has been too fast. Likewise, the odor which results from the curing of either the organotriacyloxysilane cross-linked materials or the organotriaminosilane cross-linked materials has been greater than desired.

The present invention is based on my discovery of a group of room temperature vulcanizing silicone elastomer compositions, some of which cure to both a tack-free state and to a completely cured state more rapidly than compositions of the prior art, and others of which cure more slowly than prior art compositions. In addition, these compositions produce a less objectionable odor on curing than any of the prior art systems.

My invention is based on the discovery of compositions stable under anhydrous conditions but curable to the solid, elastic state upon exposure to moisture normally present in the atmosphere, in which the key ingredient is an acyloxyaminosilane of a specific type. More particularly, the curable compositions of the present invention comprise an acyloxyaminosilane having the formula:

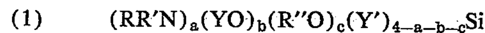

$$(1)\qquad (RR'N)_a(YO)_b(R''O)_c(Y')_{4-a-b-c}Si$$

and a liquid silanol chain-stopped polydiorganosiloxane having the formula:

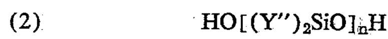

$$(2)\qquad HO[(Y'')_2SiO]_nH$$

where R is a monovalent hydrocarbon radical free of aliphatic unsaturation; R' is hydrogen or a monovalent hydrocarbon radical free of aliphatic unsaturation of the same scope as R; R'' is an alkyl radical; Y is a monovalent acyl radical of an aliphatic monocarboxylic acid having from 1 to 6 carbon atoms; Y' is a monovalent hydrocarbon radical free of aliphatic unsaturation of the same scope as R'; Y'' is a member selected from the class consisting of monovalent hydrocarbon radicals, halogenated monovalent hydrocarbon radicals and cyanoalkyl radicals; $a$ is a whole number equal to from 1 to 2, inclusive; $b$ is a whole number equal to from 1 to 2, inclusive; $c$ is a whole number equal to from 0 to 2, inclusive; the sum of $a$ plus $b$ is a whole number equal to from 2 to 3, inclusive; the sum of $a$ plus $b$ plus $c$ is a whole number equal to from 3 to 4, inclusive; and $n$ has a value of at least 10.

The acyloxyaminosilanes of Formula 1 are described and claimed in my copending application Serial No. 587,965 filed October 20, 1966, filed concurrently herewith and assigned to the same assignee as the present invention. My aforementioned copending application is hereby incorporated by reference into the present application for details on the method of preparation of the acyloxy aminosilanes and for extensive illustrations of various types of acyloxyaminosilanes employed in the practice of the present invention, including specific illustrations of the various radicals represented by the various letters in the Formula 1, as well as variations in the various subscripts. Needless to say, the Formula 1 makes clear that the acyloxyaminosilanes employed in the practice of the present invention can contain up to one silicon-bonded monovalent hydrocarbon radical, must have at least one silicon-bonded amino group, must have at least one silicon-bonded acyloxy group, can have up to two silicon-bonded alkoxy groups, can have no more than three total amino and acyloxy groups, and must have at least three total amino, alkoxy, and acyloxy groups.

The acyloxyaminosilanes employed in the practice of the present invention are generally clear liquid materials which are highly reactive upon exposure to moisture present in the atmosphere and, therefore, these compositions should be protected from atmospheric moisture. These compositions differ among themselves in their reactivity and the speed with which they cause curing of the silanol chain-stopped diorganopolysiloxanes to which they are added. Generally speaking, it is difficult to categorize the relative reactivities as cross-linking agents of the various acyloxyaminosilanes within the scope of Formula 1. However, it can be stated that those compositions within the scope of Formula 1 in which the sum of $a$ plus $b$ is equal to 3 are more reactive than materials in which the sum of $a$ plus $b$ is equal to only 2. When the sum of $a$ plus $b$ is equal to 2, the reactivity of the acyloxyaminosilanes is either slower than or equal to the reactivity of the methyltriacetoxysilanes or the methyltriaminosilanes of the prior art, depending upon the particular nature of the groups attached to silicon in the compositions of Formula 1. When the sum of $a$ plus $b$ is equal to 3, the reactivity of the acyloxyaminosilanes is greater than the reactivity of methyltriacetoxysilanes or methyltriaminosilanes so that conversion of the curable compositions to both the tack-free state and to the fully cured state occurs more rapidly than with prior art materials. In addition, regardless of whether the compositions within the scope of Formula 1 are those in which the sum of $a$ plus $b$ is equal to 2 or the sum of $a$ plus $b$ is equal to 3, the odor which results from the curing of the composition is much less than the odor resulting from the cure with either of the other materials.

While any of the acyloxyaminosilanes within the scope of the present invention are satisfactory for the preparation of the compositions of the present invention, the preferred compositions of the present invention are those in which the acyloxyaminosilane is selected so that Y is actyl and Y' is methyl or phenyl. Typical acyloxyaminosilanes employed in the practice of my invention include, for example, acetoxydi(isopropylamino)phenylsilane, diacetoxy(isopropylamino)phenylsilane, acetoxydi(isopropylamino)methylsilane, acetoxydi(isopropylamino)tertiarybutoxysilane, acetoxy(isopropylamino)(methoxy)methylsilane, acetoxy(isopropylamino)dimethoxysilane, acetoxy(isopropylamino)diethoxysilane, and butyroxy(butylamino)(methoxy)hexylsilane.

The liquid silanol chain-stopped polydiorganosiloxanes employed in the practice of the present invention are also well known in the art and include diorganopolysiloxanes of Formula 2 in which Y'' represents alkyl radicals, e.g., methyl, ethyl, propyl, butyl, octyl, octadecyl, etc. radicals; aryl radicals, e.g., phenyl, naphthyl, tolyl, xylyl, etc, radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated monovalent hydrocarbon radicals, e.g., chloromethyl, chlorophenyl, trifluoromethylpropyl, dibromophenyl, bromohexyl, bromocyclohexenyl, trifluoromethylphenyl, etc. radicals; cyanoalkyl radicals, e.g., cyanomethyl, betacyanoethyl, beta-cyanopropyl, gamma-cyanopropyl, omega-cyanobutyl, etc. radicals. Also included within the diorganopolysiloxanes of Formula 2 are compositions which contain more than one type of Y'' group. For example, some of the Y'' groups can be methyl and others can be phenyl and/or beta-cyanoethyl. In any event, it is preferred that all of the Y'' groups of the polydiorganosiloxane be methyl radicals. However, in the event that other groups are present, it is preferred that at least 50% of the Y'' groups are methyl groups.

Also included within the silanol chain-stopped diorganopolysiloxanes of Formula 2 are copolymers containing more than one type of diorganosiloxane unit. For example, included within such compositions are copolymers of dimethylsiloxane units and methylphenylsiloxane units; as well as copolymers of dimethylsiloxane units, diphenylsiloxane units and methylvinylsiloxane units. Likewise, it is possible that a mixture of several different silanol chain-stopped diorganopolysiloxanes within the scope of Formula 2 can be employed. Furthermore, while the materials within the scope of Formula 2 have been described as diorganopolysiloxanes, it should be understood that such materials can contain minor amounts, e.g., up to about 1 mole percent of monoorganosiloxane units or triorganosiloxane units in which the organo groups are of the same scope as Y''.

The liquid silanol chain-stopped diorganopolysiloxanes employed in the practice of the present invention can vary from thin fluids up to viscous gums, depending upon the value of $n$ of Formula 2 and the nature of the particular organic groups attached to the silicon atom. Preferably, however, the silanol chain-stopped diorganopolysiloxane is selected to have a viscosity in the range of from about 100 centipoises to 50,000 centipoises or 100,000 centipoises when measured at 25° C.

The room temperature curing silicone rubber compositions of the present invention are prepared by merely mixing, under substantially anhydrous conditions, the acyloxyaminosilanes of Formula 1 with the liquid silanol chain-stopped diorganopolysiloxane of Formula 2. Since, as mentioned above, the acyloxyaminosilanes of Formula 1 tend to hydrolyze upon contact with moisture, care should be exercised during their storage and addition to the silanol chain-stopped diorganopolysiloxane to exclude moisture. Likewise, care should be taken to insure that the mixture of the acyloxyaminosilane of Formula 1 and the diorganopolysiloxane of Formula 2 is maintained under substantially anhydrous conditions if it is desired to store the mixture for an extended period of time prior to conversion of the mixture to the silicone rubber state. On the other hand, if it is desired to permit the mixture to cure immediately upon the addition of the silane to the diorganopolysiloxane, no special precautions need to be taken and the two materials are merely mixed and placed in the form or shape in which it is desired for the material to cure.

The amount of the acyloxyaminosilane of Formula 1 added to the liquid silanol chain-stopped diorganopolysiloxane of Formula 2 can vary within wide limits. However, for best results, it is preferred to add at least 2.0 parts, e.g., from 2.0 to 2.5 parts by weight of the acyloxyaminosilane of Formula 1 per 100 parts of the diorganopolysiloxane of Formula 2. Satisfactory curing can be obtained, however, with amounts of the silane of Formula 1 as low as about 1.0 part of the acyloxyaminosilane per 100 parts of the diorganopolysiloxane. It has been found that satisfactory curing is obtained with from about 1.0 to 5.0 parts of the acyloxyaminosilane per 100 parts of the diorganopolysiloxane of Formula 2.

The compositions prepared by mixing the acyloxyaminosilanes of Formula 1 with the liquid silanol chain-stopped diorganopolysiloxanes of Formula 2 can be used without further modification in many sealing, caulking, or coating applications by merely placing the compositions in the desired place and permitting them to cure upon exposure to moisture present in the atmosphere. Upon exposure of such compositions to atmospheric moisture, even after storage for times as long as two years or more, the compositions will cure to the tack-free state in from one to two minutes up to several hours and will cure completely in times which range from a few minutes to ten to twenty hours, depending upon the type and amount of the silane of Formula 1 in the composition.

It is sometimes desirable to modify the compositions of the present invention by the incorporation of various fillers or extenders to change various properties, such as color or cost. Illustrative of the many fillers which can be employed with the compositions of the present invention are titanium dioxide, lithopone, zinc oxide, zirconium silicate, silica aerogel, iron oxide, diatomaceous earth, calcum carbonate, fumed silica, precipitated silica, glass fibers, magnesium oxide, chromic oxide, zirconium oxide, aluminum oxide, crushed quartz, calcined clays, asbestos, carbon and graphite, as well as other organic materials, such as cork, cotton and synthetic fibers. When fillers are added to the compositions of the present invention, they are generally employed in amounts of from about 20 to 200 parts filler per 100 parts of the liquid silanol chain-stopped diorganopolysiloxane of Formula 2.

Where fillers or other additives are employed in the compositions of the present invention, these materials are added at any stage in the preparation of such compositions. Specifically, the fillers, the liquid silanol chain-stopped diorganopolysiloxanes of Formula 2 and the acyloxyaminosilane of Formula 1 can be added in any order, with adequate protection maintained to keep the entire reaction mixture substantially anhydrous when it is desired to store the resulting mixture for an extended period of time prior to use. The presence of the fillers in the compositions of the present invention has no significant effect on the curing characteristics of such compositions.

While many room temperature vulcanizing silicone elastomer compositions are benefited by the incorporation of metal salts of carboxylic acids, such as dibutyl tin dilaurate, stannous octoate, lead octoate, etc., it is found that the compositions of the present invention cure at a very satisfactory rate without such extra materials.

The room temperature curing silicone rubber compositions of the present invention are particularly adapted for caulking and sealing applications, where adhesion to various surfaces is important and where speed of cure and the reduction in odor during cure is desirable. For example, these materials are useful in household caulking applications, and industrial applications, such as on buildings, factories, automotive equipment and where adhesion to masonry, glass, plastic, metal and wood is required.

The following examples are illustrative of the practice of my invention and are not intended for purposes of limitation. All parts are by weight.

In all of the following examples the acyloxyaminosilane was prepared by the procedure described in my aforementioned copending application Serial No. 587,965 filed October 20, 1966. In Examples 1 through 10 which follow, compositions were prepared by mixing under anhydrous conditions specified amounts of one of the acyloxyaminosilanes and a silanol chain-stopped dimethylpolysiloxane having a viscosity of about 3500 centistokes when measured at 25° C. After mixing the acyloxyaminosilane and the polysiloxane, a portion of each mixture (about 20 g.) was poured into an aluminum dish to a depth of about ¼" and the tack-free time and time for total cure were observed. A composition was considered to be tack-free when it did not feel liquid or sticky to the touch. A composition was considered to be completely cured when the portion of the composition adjacent to the bottom of the aluminum dish was no longer liquid or tacky. In the table which follows are presented the data which show the parts of each acyloxyaminosilane per 100 parts of the silanol chain-stopped dimethylpolysilane, the tack-free time in minutes, and the cure time in hours.

TABLE

| Example | Silane | Amount, Parts | Tack-Free Time, Min. | Cure Time, Hours |
|---|---|---|---|---|
| 1 | Acetoxydi(dimethylamino)tertiarybutoxysilane $([CH_3]_2N)_2(CH_3COO)([CH_3]_3CO)Si$. | 2.5 | 60 | 20 |
| 2 | do | 4.5 | 30 | 10 |
| 3 | Acetoxydi(isopropylamino)tertiarybutoxysilane $([CH_3]_2CHNH)_2(CH_3COO)([CH_3]_3CO)Si$. | 2.5 | 15 | 5 |
| 4 | Acetoxy(isopropylamino)(methoxy)methylsilane $([CH_3]_2CHNH)(CH_3COO)(CH_3O)(CH_3)Si$. | 2.5 | 60 | 16 |
| 5 | Acetoxy(isopropylamino)dimethoxysilane $([CH_3]_2$-$CHNH)(CH_3COO)(CH_3O)_2Si$. | 2.0 | 30 | 10 |
| 6 | Acetoxy(isopropylamino)diethoxysilane $([CH_3]_2CHNH)(CH_3COO)(C_2H_5O)_2Si$. | 2.5 | 90 | 20 |
| 7 | Acetoxydi(isopropylamino)phenylsilane $([CH_3]_2CHNH)_2(CH_3COO)(C_6H_5)Si$. | 2.5 | 2 | 0.5 |
| 8 | Acetoxydi(isopropylamino)methylsilane $([CH_3]_2CHNH)_2(CH_3COO)(CH_3)Si$. | 1.0 | 5 | 0.5 |
| 9 | do | 2.5 | 2 | 0.25 |
| 10 | Diacetoxy(isopropylamino)phenylsilane $([CH_3]_2CHNH)(CH_3COO)_2(C_6H_5)Si$. | 5 | 2 | 0.5 |

*Example 11*

Retained samples of each of the compositions of Examples 1 through 10 were kept in closed containers and remained liquid for more than 2 months. When samples of each composition were poured into an aluminum dish at the end of this period, all samples readily cured to solid, elastic silicone rubber.

*Example 12*

A portion of the material of Example 5 is poured onto the surface of a woven glass cloth and subjected to atmospheric moisture. After curing, the resulting material is a glass fiber reinforced silicone rubber sheet.

*Example 13*

A mixture is prepared of 100 parts of a silanol chain-stopped dimethylpolysiloxane having a viscosity of 100,000 centistokes at 25° C., 25 parts of a finely divided fumed silica, 5 parts red iron oxide, and 2.5 parts of acetoxy (isopropylamino)diethoxysilane. A portion of the composition is troweled onto a concrete floor to a depth of one-quarter inch. At the end of 12 hours, the silicone rubber cures to a strong, red elastomer which firmly adheres to the concrete surface.

While the foregoing examples have illustrated many of the embodiments of my invention, it should be understood that my invention is directed broadly to the use of the acyloxyaminosilanes within the scope of Formula 1 in the amounts previously described in various silanol-containing organopolysiloxanes to cause cure of the organopolysiloxanes to the solid, elastic state.

What I claim as new and desire to secure by Letters Patent of the United States is:

1. A room temperature curing organopolysiloxane composition stable under anhydrous conditions and curable to the solid, elastic state upon exposure to moisture comprising an acyloxyaminosilane having the formula:

$$(RR'N)_a(YO)_b(R''O)_c(Y')_{4-a-b-c}Si$$

and a liquid silanol chain-stopped polydiorganosiloxane having the formula:

$$HO[(Y'')_2SiO]_nH$$

where R is a monovalent hydrocarbon radical free of aliphatic unsaturation; R' is a member selected from the class consisting of hydrogen and monovalent hydrocarbon radicals free of aliphatic unsaturation; R'' is an alkyl radical; Y is a monovalent acyl radical of an aliphatic monocarboxylic acid having from 1 to 6 carbon atoms; Y' is a monovalent hydrocarbon radical free of aliphatic unsaturation; Y'' is a member selected from the class consisting of monovalent hydrocarbon radicals, halogenated monovalent hydrocarbon radicals and cyanoalkyl radicals; *a* is a whole number equal to from 1 to 2, inclusive; *b* is a whole number equal to from 1 to 2, inclusive; *c* is a whole number equal to from 0 to 2, inclusive; the sum of *a* plus *b* is a whole number equal to from 2 to 3, inclusive; the sum of *a* plus *b* plus *c* is a whole number equal to from 3 to 4, inclusive; and *n* has a value of at least 10.

2. A composition of claim 1 in which said acyloxyaminosilane is present in an amount equal to from about 1.0 to 5.0 parts by weight per 100 parts by weight of said polydiorganosiloxane.

3. A composition of claim 1 in which Y'' is methyl.

4. A composition of claim 1 in which *c* is equal to 0.

5. A composition of claim 1 in which *c* is 0 and Y' is a member selected from the class consisting of methyl and phenyl.

6. A composition of claim 1 in which Y is acetyl.

7. A composition of claim 1 in which *c* is 0, Y is acetyl, Y' is methyl, and Y'' is methyl.

References Cited

UNITED STATES PATENTS 3,133,110 5/1964 Morehouse et al. ______ 260—46.5
3,296,195 1/1967 Goossens ____________ 260—46.5

DONALD E. CZAJA, *Primary Examiner.*

LEON J. BERCOVITZ, *Examiner.*

M. I. MARQUIS, *Assistant Examiner.*